(12) United States Patent
Vali et al.

(10) Patent No.: US 6,259,089 B1
(45) Date of Patent: Jul. 10, 2001

(54) INTEGRATED OPTICS ROTATION SENSOR

(75) Inventors: Victor Vali, Laguna Hills, CA (US);
Bruce Youmans, Sierra Vista, AZ (US);
Colleen Fitzpatrick, Fountain Valley, CA (US)

(73) Assignee: Rice Systems, Inc., Irvine, CA (US)

( * ) Notice: Subject to any disclaimer, the term of this patent is extended or adjusted under 35 U.S.C. 154(b) by 0 days.

(21) Appl. No.: 09/079,581

(22) Filed: May 15, 1998

(Under 37 CFR 1.47)

(51) Int. Cl.⁷ .................................................. G01C 19/72
(52) U.S. Cl. ............................. 250/231.12; 250/227.19; 356/460; 356/465
(58) Field of Search ........................ 250/227.11, 227.12, 250/227.14, 227.19, 231.1, 231.12; 356/350, 349, 345, 459, 460, 461, 465, 466

(56) References Cited

U.S. PATENT DOCUMENTS

| | | |
|---|---|---|
| 4,422,331 | 12/1983 | Walker . |
| 4,588,296 * | 5/1986 | Cahill et al. ........................... 356/350 |
| 4,915,503 * | 4/1990 | Pavlath ................................... 356/350 |
| 5,317,929 | 6/1994 | Brown et al. . |
| 5,485,402 | 1/1996 | Smith et al. . |
| 5,496,979 | 3/1996 | Behr . |
| 5,585,778 | 12/1996 | Brauer et al. . |
| 5,595,942 | 1/1997 | Albrecht et al. . |
| 5,602,642 * | 2/1997 | Bergh et al. .......................... 356/350 |
| 5,611,731 | 3/1997 | Bouton et al. . |
| 5,615,132 | 3/1997 | Horton et al. . |
| 5,633,960 | 5/1997 | Lagakos et al. . |
| 5,684,298 | 11/1997 | O'Connor et al. . |

* cited by examiner

*Primary Examiner*—John R. Lee
(74) *Attorney, Agent, or Firm*—Price and Gess

(57) ABSTRACT

A gyroscope which utilizes light waves to sense motion in the plane of the substrate. The gyroscope has a primary optical waveguide which is adapted to pass light from a single light source through the primary optical waveguide in both directions. The light exiting from each end of the primary optical waveguide is withdrawn and passed through two dedicated waveguides (one dedicated waveguide for each end of the primary optical waveguide). Preferably, these two dedicated waveguides have differing times for light travel such that one of the dedicated waveguides emits its light one-quarter wavelength behind the other dedicated waveguide. The light being emitted from each dedicated waveguide is then combined permitting a sensor to monitor any shifts between the two light signals as a monitor to motion of the primary optical waveguide.

23 Claims, 3 Drawing Sheets

INTEGRATED OPTICS ROTATION SENSOR

BACKGROUND OF THE INVENTION

1. Field of the Invention

The present invention relates generally to gyroscopes and more particularly to gyroscopes which employ optical waveguides.

2. Description of the Prior Art

Optical rotation sensors, also known as gyroscopes, are based on the well-known nonreciprocal optical effect known as the Sagnac effect. Simply stated, if two beams of light travel in opposite directions in a well-defined, stationary closed loop, the optical pathlengths associated with the clockwise (CW) and counterclockwise (CCW) beams will be the same. However, if the system is rotating, one beam of light will be traveling in the direction of rotation, and the other beam of light will be traveling opposite to the direction of rotation. This breaks the symmetry of the system, that is, it introduces nonreciprocity into the system. In this case, the optical pathlengths of the clockwise and counterclockwise beams become different, with the difference proportional to the rotation rate, as well as the area enclosed by the loop with its normal parallel to the axis of rotation.

There are several types of optical gyroscopes which are based on the Sagnac effect.

In Ring Laser Gyros (RLGs), the CW and the CCW beams are passed in opposite directions around a resonator loop and each direction is kept at resonance by modifying the effective optical length around the loop for example by directly changing the length of the resonator loop, by a piezo-electric transducer. The rate of rotation applied to the gyro may be determined by detecting the frequency difference between the resonant CW and CCW beams and dividing the difference by a scale factor.

A conventional RLG consists of a dimensionally-stable polygon with at least three edges with mirrors positioned to form a closed optical path. This optical path is established within a vessel, in which a gas discharge path is provided. The gas discharge path in the ring resonator acts as an optical amplifier.

With sufficient gain of the gas discharge, the system will operate as a ring laser. Counterpropagating laser beams inside the cavity create a standing wave pattern at the resonance As frequency of the cavity. A fraction of the generated laser beams are coupled out by means of a partially transparent mirror, and form an interference pattern which is detected by two side-by-side detectors.

As the gyro is rotated, the optical path length changes for the beams propagating CW and CCW in the cavity in opposite sense. Therefore, the ring laser operates at different resonance frequencies in the CW and CCW directions, and will provide a beat frequency at the output, proportional to the rotation rate as well as the area enclosed within the polygon.

A second type of optical gyroscope which relies on the Sagnac effect is the Fiber Optics Gyro (FOG), which employs a coil of optical fiber through which light waves are transmitted in opposite directions. When the FOG is at rest, the CW and CCW beams experience the same transit time through the coil, and therefore, when the two beams are coupled out of the coil and superimposed on a detector, they exhibit a nominally zero phase difference. When the FOG is rotated around its axis of symmetry, perpendicular to the plane of the optical coil, however, one beam of light travels with the rotation, and the other travels against the rotation, so that the two beams no longer have identical transit times, and will exhibit a phase difference at the output.

This phase difference is proportional to the rotation rate, as well as the area enclosed by the coil. Analysis of the interference pattern of the combined light waves at the photodetector, typically by means of a connected signal processor, provides an indication of rate and direction of rotation.

Winding lengths of low-loss optical fiber on a relatively small coil creates a large effective area, making it possible for a compact sensor to resolve very small rotation rates.

The manufacturing costs of these types of gyros, particularly the optical portion, are considerable, which can limit their application. To improve the gyros of the above types, so that less adjustment work is required and so that they can be mass-produced at low cost, part or all of the optical gyroscope can be located on a silicon integrated optics chip (IOC). In an Integrated Ring Laser Gyro (IRLG), the optical components of the ring resonator are replaced by an optical waveguide forming a closed loop on the integrated optics substrate. The other optical and electron-optical functions of the gyro can also be located on the same IOC. Realizations of this concept are known from, for example, U.S. Pat. No. 5,327,215 granted Jul. 5, 1994, and U.S. Pat. No. 5,408,492, granted Apr. 18, 1995.

An Integrated Fiber Optic Gyro (IFOG) is a variation of the FOG, which does not go as far with integration as the IRLG. In this case, the fiber optics coil is still present, but the optical and electro-optical functions of the IFOG are located on an Intergrated optics chip. Realizations of this concept are known from, for example, U.S. Pat. No. 5,194,917, granted Mar. 16, 1993, as well as U.S. Pat. No. 5,321,503, granted Jun. 14, 1994.

In the FOG discussed above, the output signal is manifested by a sinusoidally varying intensity pattern. The sensitivity of the device is governed by the gradient of the signal shape near the working point.

For maximum sensitivity, the working point of the sensor should be at the point of maximum gradient. This occurs when the two interfering light beams are a quarter wavelength out of phase, and is known as the quadrature point.

FOGs use a number of phase modulation methods to obtain quadrature. The most well known is to incorporate a piezoelectric device into the gyro loop operating at a frequency such that a nonreciprocal quadrature phase shift is introduced into the system. However, because of the reciprocity of the counterpropagating beams of light, it is not possible to effect the quadrature biasing by any manipulation of the length of the optical fiber sensor portion of the FOG.

It is clear that there is a need for a solid-state type of gyroscope to address the problems discussed above.

SUMMARY OF THE INVENTION

The present invention is a gyroscope which utilizes light waves to sense rotation around an axis normal to the plane of the substrate. In this context, the substrate forming the plane is preferably a silicon chip commonly used in the electronics industry. Those of ordinary skill in the art readily recognize a variety of other materials which can be used for the substrate or wafer construction.

On this substrate, a primary optical waveguide is created. This primary optical waveguide, in the preferred embodiment, is created by a waveguide coil having two ends. A light source, mounted onto the substrate in some embodiments, provides, via a beamsplitter, light to both ends of the optical waveguide. The light is then passed through the primary optical waveguide in both directions (for sake of definition, a clockwise (CW) passage and a counter-clockwise (CCW) passage).

Hence, the light entering one end of the primary optical wave guide exits from the opposing end. Using beamsplitters, the light exiting from each end of the primary optical waveguide is passed through two dedicated waveguides (one dedicated waveguide for each end of the primary optical waveguide).

The light from both dedicated waveguides is combined using a beam combiner which allows changes created in the two beams by motion of the substrate, to be analyzed for motion.

To further enhance the sensitivity of the gyroscope of this invention, the two dedicated waveguides have differing times for light travel. This "light transmittal time" is the time it takes for light to travel from one end of a dedicated waveguide to the other. In this context, the "light transmittal time" for one of the dedicated waveguides is preferably one-quarter wavelength different from the other dedicated waveguide.

This delay is caused by either lengthening one dedicated waveguide relative to the other or by treating one waveguide to "slow" the speed of light therethrough. Those of ordinary skill in the art readily recognize a variety of other techniques which will accomplish this one-quarter wavelength variation.

The one-quarter wavelength difference causes the system to operate at quadrature so that optimal sensitivity is obtained.

In more specific terms, the present invention creates a new optical rotation sensor, based on a nonreciprocal optical configuration.

The preferred embodiment of this invention uses a spiral-shaped integrated optics waveguide, light source means, coupler means for coupling light from the light source means into the spiral-shaped waveguide, with a first direction of propagation and a second direction of propagation opposite thereto, and for coupling light out of the spiral-shaped waveguide, and for detector means exposed to light coupled out by the coupler means.

In this manner, the present invention provides an improved optical gyro system which is easily mass produced at low cost. This advantage is obtained by an integrated optics gyroscope using a sensing coil, wherein the optical and the electro-optical components, as well as the sensing coil, are preferably integrated onto a silicon substrate. This has the advantage of eliminating the need for a resonance cavity or for a macroscopic fiber optic coil, as well as the need to adjust the source-to-waveguide, and the waveguide-to-detector optical alignment.

The integrated optics gyroscope of this invention is easily fabricated on a substrate, which is produced at very low cost and worked with high precision by well controlled manu-facturing techniques. In addition, any individual or group of the electrical functional units can be selectively integrated on the substrate, which results in a further cost reduction.

The substrate allows the use of a light source in the form of a low cost, commercially available laser chip or light emitting diode (LED), including edge light emitting diodes (ELED) and super luminescent diodes (SLD).

Further, the present invention provides a passive means of biasing the operating point of the integrated optics gyro without the need for electrical means of active control. This is achieved through manipulating the fixed geometry of the waveguide output ports interfacing the integrated optics gyro coil with the detector, or by generating a dynamic bias phase by operating the gyro at a fixed baseline rotation rate.

DESCRIPTION OF THE DRAWINGS

The invention will be explained in more detail, with reference to the accompanying drawings, in which.

DESCRIPTION OF THE PREFERRED EMBODIMENTS

Figure 1A:
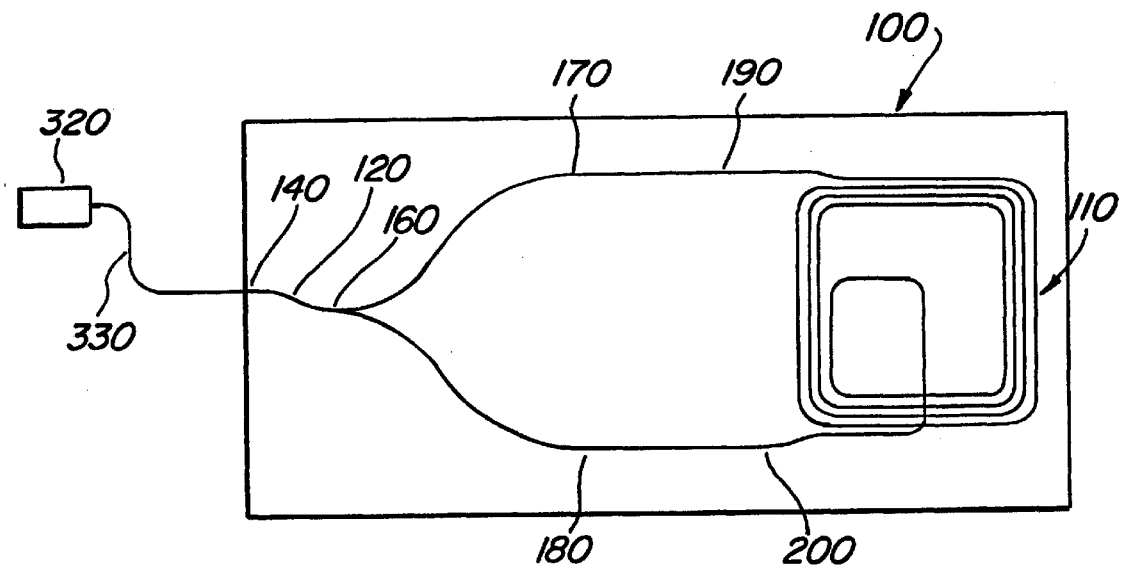
FIGS. 1A and 1B schematic representation of the integrated optic rotation sensor (IORS) formed in a silicon substrate showing a portion of the external connections to a light source, and a photodetector.
Figure 1B:
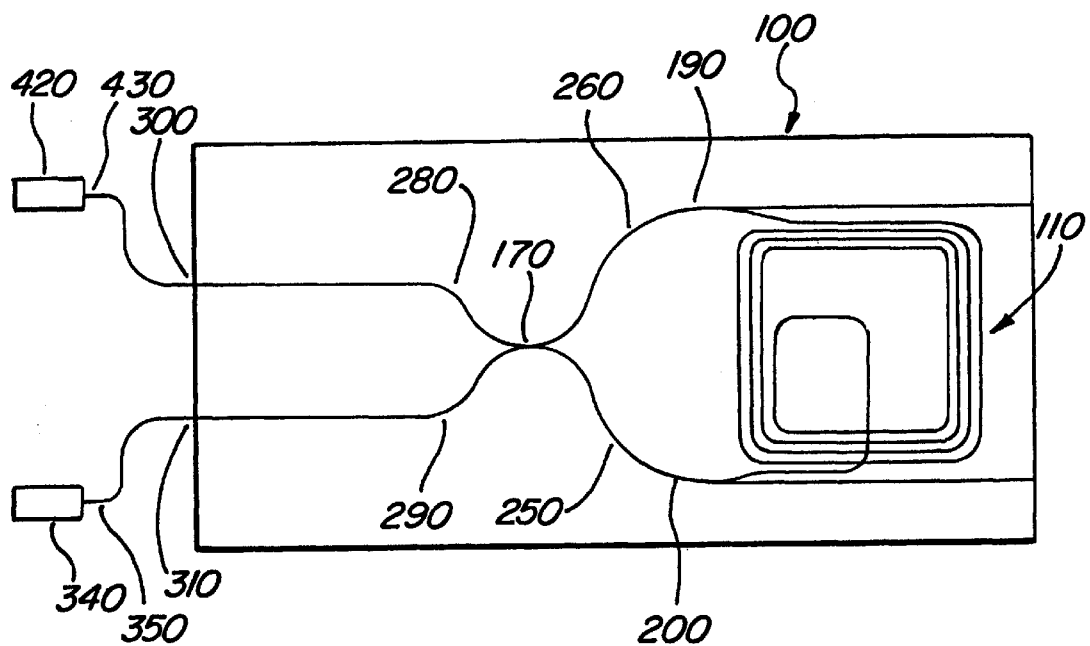
Figure 2:
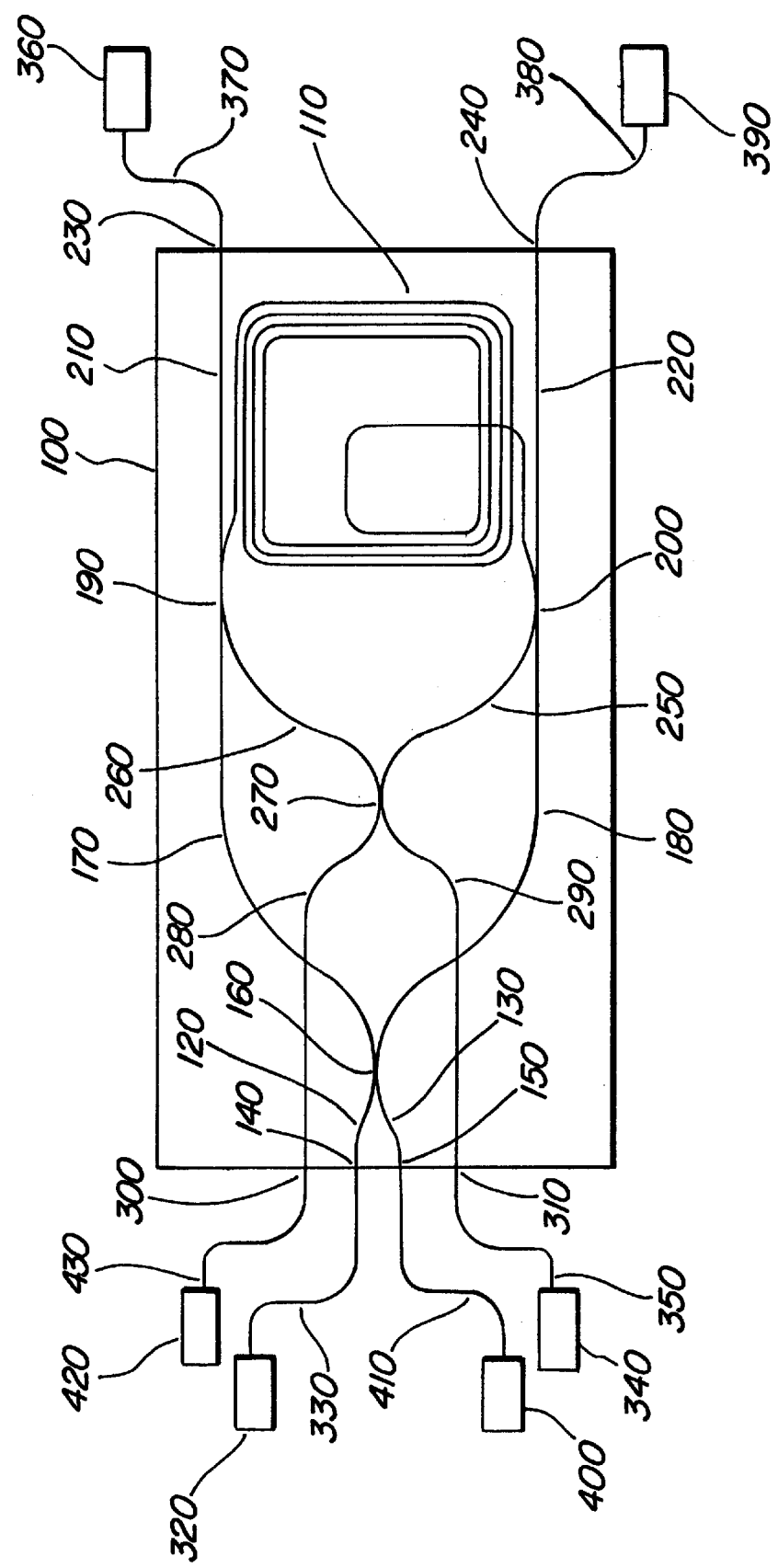
FIG. 2 is a schematic representation of the intergrated optic rotation sense formed in a silicon substrate showing all the external connections to a light source, and the photodetector shown.

FIG. 1A, 1B and 2 are schematic representations of an IORS that incorporates the principles of the invention. The IORS is implemented in a solid medium on a host substrate 100, in which are formed a spiral waveguide 110, waveguides 120, 130 extending from input port 140 and output port 150 on the leading edge of the host substrate 100 to the integrated optics beamsplitter 160; waveguides 170, 180 extending from the integrated optics beamsplitter 160 to the integrated optics beamsplitters 190, 200 on the periphery of the spiral sensor waveguide 110; waveguides 210, 220 extending from the integrated optics beamsplitters 190, 200 on the periphery of the spiral waveguide 110 to monitor ports 230, 240 on the back edge of the host substrate 100; waveguides 250, 260 extending from the integrated optics beamsplitters 190, 200 on the periphery of the spiral waveguide 110 to the integrated optics beamsplitter 270; and waveguides 280, 290 extending from the integrated optics beamsplitter 270 to the output ports 300, 310 on the leading edge of the host substrate 100. In one embodiment, the waveguides are formed in a silicon host substrate in a well known fashion. The silicon may be doped with phosphorus or a similar substance to decrease the optical attenuation in the waveguide. Other substrates and other dopants may be used as well.

A commercially available LED 320 generates the source light that enters the substrate 100 at input port 140 which travels through waveguide 120 through beamsplitter 160 to enter the spiral waveguide at beamsplitter 190 as the CW wave and exts at beamsplitter 200 following waveguide 180 back into beamsplitter 160. Likewise, the CCW beam which entered the spiral waveguide 110 at beamsplitter 200 exits at beamsplitter 190, with half of the exiting beam following waveguide 260 into beamsplitter 270 and the other half following waveguide 170 into beamsplitter 160. The two beams combined at beamsplitter 270 interfere and the combined beam is then split again, with the two resulting beams traveling through waveguides 280, 290 to output ports 300, 310 where their interference pattern is detected with detectors 340, 420 connected to output ports 300, 310 by means of fiber optic pigtails 350, 430 to integrated optics waveguides 280, 290.

In the same manner, the two beams in waveguides 170, 180 combine at beamsplitter 160, interfere, and the combined beam is then split again, with the two resulting beams traveling through waveguides 120, 130 to output ports 140, 150. Their interference pattern can be detected with a detector 400 connected to output port 150 by means of a fiber optic pigtail 410 to integrated optics waveguide 130.

A commercially available signal processor can be connected to detectors 360, 390 in a known fashion to obtain information on the light power level being introduced into spiral waveguide 110 through beamsplitters 190, 200. The signal processor is also connected to detectors 340, 400, 420 and analyzes the detector outputs in a well-known fashion to derive rotation rate and rotation direction information.

When the light from LED 320 is coupled into the spiral coil 110 in counterpropagating directions, the difference in pathlength followed by the two beams is equal when the spiral waveguide 110 is stationary. The beams interfere with a certain fixed relative phase $\Delta\phi_o$, known as the bias phase. However, when the spiral waveguide 110 is rotated, an additional pathlength difference between the two counterpropagating beams in the spiral waveguide 110 is generated, as described by the Sagnac effect. This causes a phase shift $\Delta\phi$ to occur between the two counterpropagating beams in the spiral waveguide 110 which is directly proportional to the rotation rate $\omega$, and which may be expressed as:

$$\Delta\Phi = \frac{4\pi L R \omega}{\lambda c} = S\omega \quad [1]$$

Where L is the length of the spiral waveguide, R is the mean radius of the spiral waveguide, $\lambda$ is the wavelength of light, and c is the speed of light. The phase shift $\Delta\phi$ between the two counterpropagating beams is therefore related to the rotation rate of the spiral waveguide through the scale factor S, and the total relative phase shift between the two becomes $\Delta\phi_{tot}=\Delta\phi+\Delta\phi$. The intensity of light I observed by detectors 340, 400, 420 is related to the relative phase shift $\Delta\phi$ according to:

$$I=I_o Sin\Delta\phi_{tot}$$

Thus, if the bias phase $\Delta\phi$ is known, by detecting the intensity of light arriving at detectors 340, 400, 420, the rotation-dependent phase shift $\Delta\phi$ can be determined and the rotation rate $\omega$ can be derived from Eq. 1.

Figure 3:
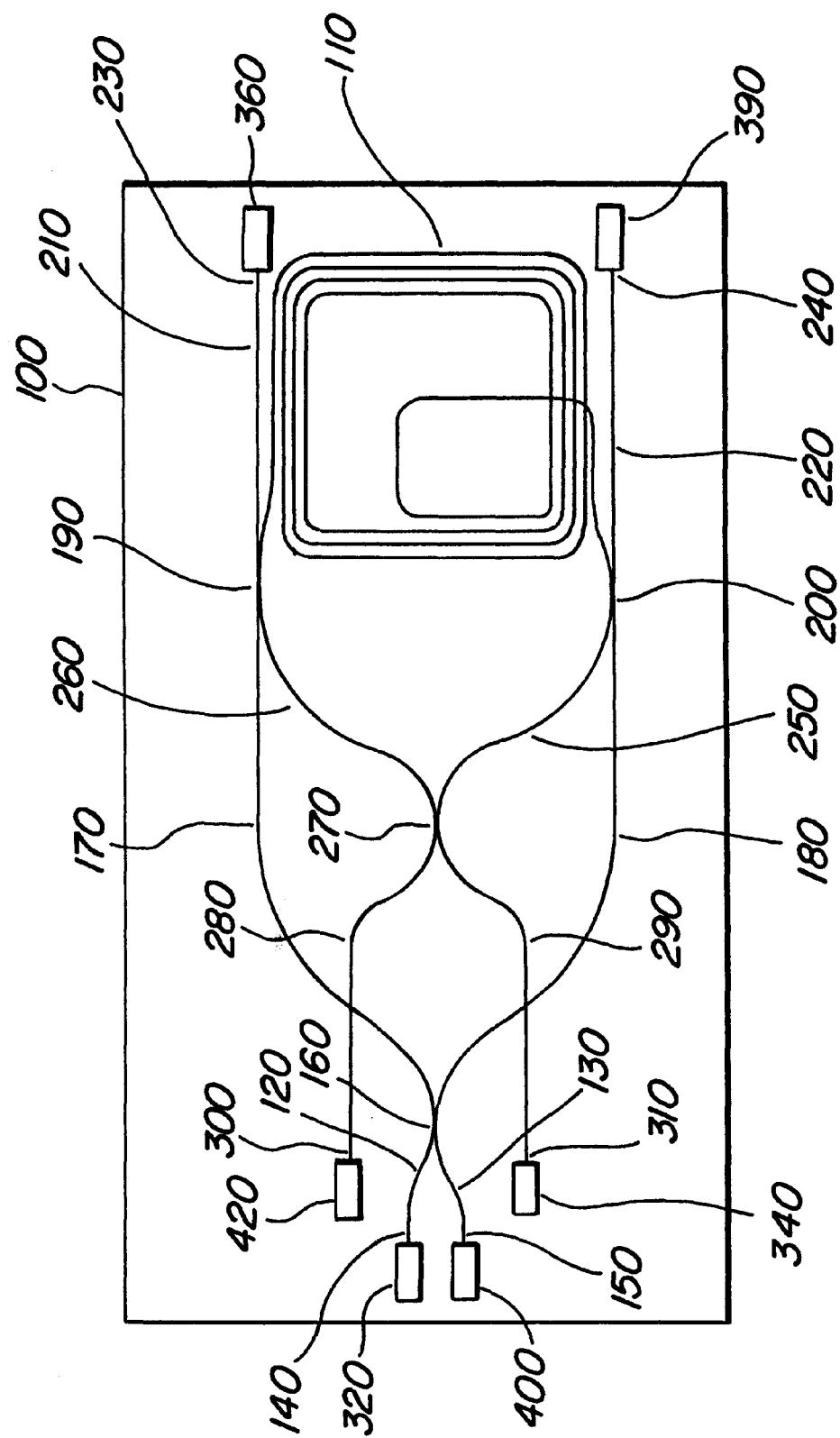
FIG. 3 is a schematic representation of the integrated optic rotation sensor formed in a silicon substrate with the light source and the photo detector incorporated directly on the integrated optics chip.

FIG. 3 is a schematic representation of a more compact IORS, incorporating LED 320 and detectors 340, 360, 390, 400, 420 directly on the IOC. In this manner, the fiber pigtails 330, 350, 370, 380, 410, 430 shown in FIG. 1 can be eliminated, and the LED 320 can be interfaced directly with input waveguide 120, and detectors 340, 360, 390, 400, 420 can be interfaced directly with output waveguides 130, 210, 220, 280, 290.

The bias phase $\Delta\phi$ determines the sensitivity of the rotation rate measurement. The maxima and minima occur when the two constituent beams are completely in phase, with $\Delta\phi_o=0$, $2\pi$, $4\pi$, ... $2n\pi$, (n =0, 1, 2, 3, ... ) or completely out of phase, with $\Delta\phi_o=\pi$, $3\pi$, $5\pi$... $n\pi$, (n odd). A slight shift in phase $\Delta\phi$ around $\Delta\phi_o$ produces little or no change in intensities $\Delta I_A$ and $\Delta I_B$. In regions where the two counterpropagating beams are 90° out of phase with respect to each other, that is where $\Delta\phi_{o=\pi}/2$, $3\pi/2$, $5\pi/2$, ... $n\pi/2$, (n odd), so that the same phase shift $\Delta\phi$ around this new value of $\Delta\phi_o$ produces a maximum change in intensity $\Delta I_C$.

Therefore, the sensitivity of an optical gyro can be maximized by operating the system such that $\Delta\phi=\pi/2$. This is known as the quadrature point.

It is to be understood that the above-described arrangement is merely illustrative of the principles of the invention and that other arrangements may be devised by those skilled in the art without departing from the spirit and scope of this invention.

It is clear that the present invention provides for a highly improved optical gyroscope which is particularly adapted for inexpensive mass production.

What is claimed is:

1. A gyroscope comprising:
   a) an optical source;
   b) a primary optical waveguide having,
      1) an extended optical waveguide having a first end and a second end, and,
      2) a primary beamsplitter adapted to communicate light from said optical source to the first end and the second end of said extended optical waveguide; and,
   c) a sensing system having,
      1) a first beamsplitter interposed between said primary beamsplitter and the first end of said extended waveguide, said first beamsplitter adapted to withdraw light emitting from the first end of said extended optical waveguide,
      2) a first optical waveguide having a first end receiving light from said first beamsplitter,
      3) a second beamsplitter interposed between said primary beamsplitter and the second end of said extended waveguide, said second beamsplitter adapted to withdraw light emitting from the second end of said extended optical waveguide,
      4) a second optical waveguide having a first end receiving light from said second beamsplitter, and,
      5) a beam combiner adapted to receive light from a second end of said first optical waveguide and a second end of said second optical waveguide and generating a combined optical signal therefrom; and,
   d) a detector being responsive to said combined optical signal.

2. The gyroscope according to claim 1, further including:
   a) a first light intensity monitor;
   b) a third beamsplitter positioned at a first end of said extended optical waveguide and communicating light thereto and to the first intensity monitor;
   c) a second light intensity monitor; and,
   b) a fourth beamsplitter positioned at a second end of said extended optical waveguide and communicating light thereto and to the second intensity monitor.

3. The gyroscope according to claim 1, wherein said first optical waveguide of said sensing system has a light transmittal time greater than a light transmittal time of said second optical waveguide of said sensing system.

4. The gyroscope according to claim 3, wherein said first optical waveguide of said sensing system is longer than said second optical waveguide of said sensing system.

5. The gyroscope according to claim 4,
   a) where said optical source produces light at a perdefined wavelength; and,
   b) wherein said first optical waveguide of said sensing system is approximately one quarter wavelength longer than said second optical waveguide of said sensing system.

6. The gyroscope according to claim 3, wherein a portion of said first optical waveguide of said sensing system is treated to increase light transmittal time therein.

7. The gyroscope according to claim 3,
   a) further including a substantially rigid substrate; and,
   b) wherein said primary optical waveguide and said sensing system are mounted on said substantially rigid substrate.

8. The gyroscope according to claim 7, wherein said substrate includes silicon.

9. The gyroscope according to claim 7, wherein said substrate includes silica glass and sapphire.

10. The gyroscope according to claim 7, wherein said substrate includes lithium niobium and lithium tantalite.

11. The gyroscope according to claim 7, wherein said optical source and said detector are mounted on said substrate.

12. The gyroscope according to claim 11, wherein said optical source includes a broadband low coherence length light source.

13. The gyroscope according to claim 12, wherein said broadband low coherence length light source includes an edge light emitting diode.

14. The gyroscope according to claim 12, wherein said broadband low coherence length light source is a superluminescent diode.

15. The gyroscope according to claim 1, wherein said primary optical waveguide is substantially a spiral.

16. The gyroscope according to claim 1, wherein said primary optical waveguide, said first optical waveguide, and said second optical waveguide are doped with phosphorus and germanium.

17. The gyroscope according to claim 1, wherein said primary optical waveguide, said first optical waveguide, and said second optical waveguide are doped with silicon nitride.

18. An optically actuated gyroscope comprising:
   a) a closed optical path adapted to communicate a first and a second light wave through a single path in opposing directions; and,
   b) a sensing system having,
      1) a first waveguide and a second waveguide, said first waveguide having a light transmittal period differing from said second waveguide, said first waveguide adapted to receive light emitting from a first end of said closed optical path, said second waveguide adapted to receive light emitting from a second end of said closed optical path, and,
      2) a beam combiner adapted to combine light emitting from a second end of said first waveguide and said second waveguide.

19. The optically actuated gyroscope according to claim 18, wherein said first waveguide of said sensing system is longer than said second waveguide of said sensing system.

20. The optically actuated gyroscope according to claim 19,
   a) further including an optical source producing light at a predefined wavelength, said light being communicated to the first end and the second end of said closed optical path; and,
   b) wherein said first waveguide of said sensing system is one quarter wavelength longer than said second waveguide of said sensing system.

21. The optically actuated gyroscope according to claim 18, wherein a portion of said first waveguide of said sensing system is treated to increase light transmittal time therein.

22. The optically actuated gyroscope according to claim 20, wherein said optical source includes a broadband low coherence length light source.

23. The optically actuated gyroscope according to claim 18, wherein said closed optical path is substantially a spiral.

* * * * *